United States Patent Office 2,696,436
Patented Dec. 7, 1954

2,696,436

PHOTOGRAPHIC EMULSION

Robert D. Bensley, Gohome, Ontario, Canada

No Drawing. Application January 18, 1951,
Serial No. 206,715

10 Claims. (Cl. 95—7)

This invention relates to a photographic emulsion, and more particularly to a photographic emulsion having greatly improved characteristics. This application is a continuation in part of my copending application Serial No. 703,471, filed October 16, 1946, now abandoned.

Photographic plates and films of commercial production are often coated with more than one layer of emulsions. Emulsions are often different in characteristics but they are each complete before coating, and little mixing of the emulsions takes place. On other films, emulsions of different characteristics are mixed together thoroughly and then coated upon the plate or film. Such emulsions may be used for photographic purposes as furnished by the manufacturer or their characteristics may be modified by immersion before use in various solutions with the purpose of increasing or diminishing their over-all sensitivity or to confer on them sensitivity to new areas of the spectrum.

I have discovered a process of improving the characteristics of commercial film by implanting a halide within the substance of the gelatin and between and upon the silver halide grains already there, and find that by implanting such a halide, the resulting emulsion has an extremely wide range of latitude, is not subject to halation, has extremely fine grain and has other advantages as will hereinafter be set forth.

My process involves altering a photographic emulsion by impregnating the emulsion with a solution of a soluble silver salt capable of later being converted to a silver halide, after which the emulsion is immersed in a solution of a soluble chloride to convert the silver salt to silver chloride in situ in the emulsion. The concentration of silver chloride at the conclusion of the process should be sufficient to produce a useable light sensitive emulsion among the grains of the first emulsion after conversion to silver chloride. The process is carried out by immersing the film in a solution of a silver salt capable of being converted to a silver halide. The solution should be at a concentration of from 1% to 4%. The preferred silver salt is silver nitrate. After the immersion in the silver salt solution the film may be washed and then should be immersed in a solution of a soluble chloride capable of converting the silver salt into silver chloride in situ. The soluble chloride should be in a solution at a concentration between 5% and 10%. The silver chloride produced by the second immersion provides a light sensitive emulsion distributed throughout the original emulsion on the film. I prefer to use a soluble chloride because the chloride ion is a faster moving ion than the silver ion and tends to go into the film and to form a precipitate of silver chloride within the gelatin. To use a halide salt having a slower ion than silver would cause the silver to come out to the halide salt and precipitate on the surface of the film, which is undesirable. The preferred chloride is ammonium chloride because silver chloride is soluble to some extent in solutions of that salt and thus precipitates of silver chloride on the surface of the film are being dissolved as the silver salt deeper in the film is being converted to silver chloride. It is possible, however, to use other soluble chlorides, such as sodium, potassium, calcium and lithium chlorides or chlorides of organic bases, but the results are not as satisfactory. Where chlorides other than ammonium are used, it is not necessary to change the concentration of the bath, which may remain at 5% to 10%.

The strengths of the solutions used in this process are important since the original gelatin base on a film cannot be modified unfavorably. Furthermore, the solutions must be of a strength capable of producing a deposit of silver chloride which is useable. The proportions set out above are quite satisfactory. In the event that a solution of silver nitrate of five percent or over is used the original film gelatin swells and shows very defined reticulation. Less than five percent or more than ten percent solutions of the soluble chlorides produce an unsatisfactory amount of silver chloride in the final emulsion.

As a specific example of the process, I may immerse a strip of super ortho press film in a 1.7% aqueous solution of silver nitrate containing 360 milligrams of citric acid per liter of solution, for approximately 2 minutes. Other soluble salts of silver may be used but I prefer to use silver nitrate because of its low cost and the citric acid is added to insure cleanliness in the emulsion. The citric acid may be omitted if the silver nitrate and water are actually pure.

The film is then washed for 30 seconds in running water. This water should be distilled or at least filtered and all trays used in the process should be of clean glass.

The film is then soaked in a 10% aqueous solution of ammonium chloride for 4 minutes and the solution kept agitated.

The film is then washed for a minimum of 4 minutes and dried in the absence of actinic light.

The film thus prepared is ready for exposure. The resulting emulsion is quite slow photographically, but due to its altered characteristics is invaluable to various kinds of scientific work where speed is not a requisite and is excellent for all types of photomechanical and copy work. The emulsion has an extremely great latitude. Once the minimum exposure from which a picture can be developed has been obtained, the exposure may be increased up to 1000 times or more and a good picture obtained. Almost any degree of contrast can be obtained by the proper manipulation of exposure and development. Great overexposures result in no halation in the finished film even when the exposure is hundreds of times the minimum.

It has been thought that grain appearing in enlargement of negatives is due not to the size of individual grains, but rather due to a clumping of developed grains. This clumping is thought to be due in part to uneven distribution of grains in the original emulsion, to the fact that such grains are not all of the same sensitivity, to fusion of developed grains and to the fact that developable grains fog adjacent grains. Apparently the process which I have just described has the effect of preventing such clumping of grains and hence the negative may be enlarged many times more than is possible with ordinary film, without grain structure appearing.

Also for reasons not completely understood, the spectral sensitivity of the homogenized emulsion is quite different from standard emulsions. Low level exposures produce a uniform response across the spectrum. As the exposure is increased the peak of sensitivity gradually shifts towards the longer wave lengths, and in all cases the usual blue sensitivity of the film is greatly reduced.

The film may be developed in a physical developer or in restrained chemical developers which, when so restrained, I believe act as physical developers. As an example of the developer:

DEVELOPER NO. 1

Athenon developer Eastman D. 74 (parahydroxyphenol glycine)

*Stock solution*

Water, 500 c. c.
Elon (methylpara aminophenol sulphate), 0.8 gram
Sodium sulphite (anhydrous), 24 grams
Hydroquinone, 4.4 grams
Glycine, 6.4 grams
Sodium carbonate (anhydrous), 12 grams
Potassium bromide, 2.2 grams
Water, to make a liter The working developer is made by diluting this stock solution with two parts of water and adding 10 cc. of a 10% solution of potassium bromide to each 100 cc. of this diluted stock. Maximum time of development is 4 minutes. Or as an example:

DEVELOPER NO. 2

*Stock solution*

Hydroquinone, 11.5 grams
Sodium sulphite (anhydrous), 50 grams
Sodium carbonate, 50 grams
Water, 1 liter This stock solution should be diluted one to two with water and 10 cc. of 10% potassium bromide added to each 100 cc. of diluted stock. Time of development is about six minutes maximum limit.

The process herein explained apparently creates a second emulsion in and among the grains of the emulsion or emulsions originally on the film. Either of the two emulsions can be handled separately. Short exposures developed the full time in developer No. 1 utilize the original emulsion almost entirely. Long exposures developed in developer No. 2 utilize the newly created emulsion almost entirely. Medium length exposures involving objects of various great difference and brilliance developed in No. 1 for 2 minutes utilize both emulsions. As an example of this latter characteristic, a piece of super ortho press film was treated by my process and exposed. The subject was illuminated by a 1200 watt projection lamp interposed about four-fifths of the distance from the camera to the subject and well within the field of the lens. The exposure was correct for the subject. The resulting negative developed in developer No. 1 showed a properly exposed negative for the subject and also a proper exposure for the projection bulb. Practically no halation was visible in the film and it is possible to see the subject through the transparent glass part of the projection bulb, even through that part closely adjoining the brilliant filament. I have also taken direct photographs of the sun with exposure ranging from $\frac{1}{300}$ of a second to 2 seconds on the same film with practically no evidence of halation or spreading of the image.

The film may be developed to practically any color desired by proper manipulations of exposure and developer. For example, an oxerexposure developel in developer No. 1 will produce a reddish image, a medium exposure, a yellow to green image and an underexposure, a green to gray image. The developer should be modified by the addition of more potassium bromide as the developer must be more highly restrained in order to develop color.

The finished picture is easily intensified, even after fixation in strong hypo, by simply putting it into Odell's physical developer until the desired results are obtained.

Any color sensitive film of commercial manufacture may be treated with my process but the results are slightly different with each. The best results are produced by using fast ortho films, such as super ortho press. The fast panchromatic films also work very well but do not have as severe a drop in blue sensitivity when treated as the ortho films.

Films which have been treated with my process are not only excellent for use as negative material but also have excellent characteristics as a printing medium on which to print positive transparencies.

The foregoing detailed description is given for clearness of understanding only, and no unnecessary limitations should be construed therefrom.

I claim:

1. The method for altering the characteristics of an unexposed photographic emulsion in the form of a light-sensitive coating of silver halide in gelatin upon a support which comprises immersing the emulsion in a 1.7% solution of silver nitrate for approximately two minutes to impregnate the emulsion therewith, washing the emulsion, and then immersing the emulsion in a 10% solution of ammonium chloride for approximately four minutes to convert the silver nitrate to silver chloride and to precipitate the silver chloride in situ.

2. The method for altering the characteristics of an unexposed photographic emulsion in the form of a light-sensitive coating of silver halide in gelatin upon a support which comprises immersing the emulsion in a 1.7% solution of silver nitrate to impregnate the emulsion with silver nitrate, washing the emulsion, and then immersing the emulsion in a 10% solution of ammonium chloride to convert the silver nitrate to silver chloride in situ.

3. The method for altering the characteristics of an unexposed photographic emulsion in the form of a light-sensitive coating of silver halide in gelatin upon a support which comprises immersing the emulsion in a solution of silver nitrate having a concentration of silver nitrate of from 1% to 4% to impregnate the emulsion therewith, washing the emulsion, and then immersing the emulsion in a solution of ammonium chloride having a concentration of ammonium chloride of from 5% to 10% to convert the silver nitrate to silver chloride in situ.

4. The method for altering the characteristics of an unexposed photographic emulsion in the form of a light-sensitive coating of silver halide in gelatin upon a support which comprises immersing the emulsion in a solution of a silver salt capable of being converted to a halide, said solution having a concentration of the salt of from 1% to 4% to impregnate the emulsion therewith, washing the impregnated emulsion, and then immersing the washed emulsion in a solution of a soluble chloride capable of converting the silver salt to silver chloride in situ, said solution having a concentration of the soluble chloride of from 5% to 10% whereby to convert the silver salt to silver chloride in situ.

5. The method for altering the characteristics of an unexposed photographic emulsion in the form of a light-sensitive coating of silver halide in gelatin upon a support which comprises immersing the emulsion in a solution of aqueous silver nitrate having a concentration of silver nitrate of from 1% to 4% to impregnate the emulsion therewith, washing the impregnated emulsion, and then immersing the washed emulsion in an aqueous solution of a soluble chloride capable of converting the silver nitrate to silver chloride in situ, said chloride solution having a concentration of soluble chloride of from 5% to 10%.

6. The method for altering the characteristics of an unexposed photographic emulsion in the form of a light-sensitive coating of silver halide in gelatin upon a support which comprises immersing the emulsion in a solution of aqueous silver nitrate having a concentration of silver nitrate of from 1% to 4% to impregnate the emulsion therewith, and then immersing the impregnated emulsion in an aqueous solution of a soluble chloride capable of converting the silver nitrate to silver chloride in situ, said chloride solution having a concentration of soluble chloride of from 5% to 10%.

7. The method for altering the characteristics of an unexposed photographic emulsion in the form of a light-sensitive coating of silver halide in gelatin upon a support which comprises immersing the emulsion in an aqueous solution containing from 1% to 4% of a water soluble silver salt capable of being converted to a silver chloride for a period sufficient to impregnate the emulsion therewith and then immersing the emulsion in an aqueous solution containing from 5% to 10% of a soluble chloride to convert the silver salt to silver chloride in situ in the emulsion.

8. An unexposed photographic emulsion produced by the method of claim 1.

9. An unexposed photographic emulsion produced by the method of claim 3.

10. An unexposed photographic emulsion produced by the method of claim 7.

References Cited in the file of this patent

UNITED STATES PATENTS

| Number | Name | Date |
|---|---|---|
| 1,538,816 | Ives | May 19, 1925 |

FOREIGN PATENTS

| Number | Country | Date |
|---|---|---|
| 568,323 | Great Britain | Mar. 29, 1945 |

OTHER REFERENCES

Wall, "History of Three-Color Photography," published by Amer. Phot. Pub. Co., Boston, 1925, pages 247–251, 253–255, 274 and 512–513.